United States Patent [19]

Yamada et al.

[11] Patent Number: 5,391,971
[45] Date of Patent: Feb. 21, 1995

[54] CIRCUIT FOR STARTING SINGLE-PHASE AC INDUCTION MOTOR

[75] Inventors: Yoshihiro Yamada; Shigehiro Ichida; Yuichi Takaoka, all of Nagaokakyo, Japan

[73] Assignee: Murata Manufacturing Co., Ltd., Kyoto, Japan

[21] Appl. No.: 67,555

[22] Filed: May 25, 1993

[30] Foreign Application Priority Data

May 25, 1992 [JP] Japan .................. 4-132614

[51] Int. Cl.⁶ ............................................. H02P 1/26
[52] U.S. Cl. ........................... 318/778; 318/471; 318/445; 318/727; 318/783; 318/788
[58] Field of Search ............... 318/778, 471, 445, 727, 318/783, 788

[56] References Cited

U.S. PATENT DOCUMENTS

| | | |
|---|---|---|
| 3,746,951 | 7/1973 | Hohman ................ 318/221 |
| 3,832,612 | 8/1974 | Woods ................. 318/471 |
| 4,265,394 | 5/1981 | Nagel ................. 318/471 |
| 4,299,026 | 11/1981 | De Filippis et al. .......... 29/612 |

FOREIGN PATENT DOCUMENTS 1183294  3/1970  United Kingdom .

*Primary Examiner*—William M. Shoop, Jr.
*Assistant Examiner*—Karen Masih
*Attorney, Agent, or Firm*—Ostrolenk, Faber, Gerb & Soffen

[57] ABSTRACT

A circuit for starting a single-phase AC induction motor 11 having a main winding 12 and an auxiliary winding 13, which is so constructed that a PTC element 16 and a triac 17 are connected in series with the auxiliary winding 13 and a gate voltage of the triac 17 is reduced to turn a portion between main terminals of the triac 17 off after a predetermined time period has elapsed since the motor 11 was started, and can effectively lower the power consumption without degrading starting characteristics and can shorten return time required until the motor 11 is restarted and lengthen the life of the PTC element 16.

5 Claims, 2 Drawing Sheets

CIRCUIT FOR STARTING SINGLE-PHASE AC INDUCTION MOTOR

BACKGROUND OF THE INVENTION

1. Field of the Invention

The present invention relates generally to a circuit for starting a single-phase AC induction motor, and more particularly, to a circuit for starting a single-phase AC induction motor comprising a circuit capable of cutting off a starting current in a contactless system after starting the motor.

2. Description of the Prior Art

In a compressor and various pumps in a refrigerator, a single-phase AC induction motor has been most commonly used. As a circuit for starting this type of single-phase AC induction motor, a starting circuit constructed using an electromagnetic relay has been widely used. However, a contact may, in some cases, be burned, for example, due to a large current flowing at the time of starting the motor. Accordingly, a starting circuit constructed using a positive temperature coefficient thermistor element (hereinafter referred to as a PTC element) in place of the electromagnetic relay has been utilized.

One example of the conventional motor starting circuit using a PTC element is shown in FIG. 2. In FIG. 2, a single-phase AC induction motor 1 has a main winding 2 and an auxiliary winding 3. Respective one ends of the main winding 2 and the auxiliary winding 3 are connected to a power supply 5 through a switch 4, and the other end of the main winding 2 is also connected to the power supply 5. In addition, the other end of the auxiliary winding 3 is connected to the power supply 5 through a PTC element 6.

In the motor starting circuit shown in FIG. 2, a current flows through the auxiliary winding 3 to start the motor 1 by turning the switch 4 on. Immediately after the motor 1 is started, a current also flows through the PTC element 6. Accordingly, the PTC element 6 is self-heated with the elapse of time. This self-heating causes the resistance value of the PTC element 6 to be rapidly increased, so that the current flowing through the PTC element 6 is rapidly reduced. Consequently, the starting current flowing through the auxiliary winding 3 is reduced, thereby to make it possible to lower the power consumption after starting the motor 1.

When the PTC element 6 is self-heated to enter a state where the resistance value thereof is high, however, the current flowing through the PTC element 6 is not zero, although reduced, as shown in FIG. 3. Specifically, a residual current with some degree of magnitude still continues to flow through the auxiliary winding 3 and the PTC element 6. Consequently, several watts of power still continues to be consumed.

Furthermore, after the switch 4 is turned off, the temperature of the PTC element 6 is not rapidly decreased. In order to restart the motor 1 after the operation of the motor 1 is terminated, therefore, the motor starting circuit must wait until the PTC element 6 is cooled. Specifically, return time required until the motor 1 can be restarted is relatively long.

Additionally, the self-heating of the PTC element 6 exerts a thermally adverse effect on components around the PTC element 6, and the life of the PTC element 6 is reduced because the PTC element 6 continues to be self-heated.

SUMMARY OF THE INVENTION

An object of the present invention is to provide, in a circuit for starting a single-phase AC induction motor using a PTC element, the circuit for starting a single-phase AC induction motor capable of further lowering the power consumption without degrading starting characteristics and capable of shortening return time required until the motor is restarted as well as lengthening the life of the PTC element.

The present invention provides a circuit for starting a single-phase AC induction motor having a main winding and an auxiliary winding, which is characterized by comprising a PTC element connected in series with the auxiliary winding, a triac having first and second main terminals and a gate terminal, a portion between the first and second main terminals being connected in series with the PTC element, and a trigger circuit connected to the gate terminal of the triac and reducing a pate voltage of the triac to turn the triac off after a predetermined time period has elapsed since the motor was started.

In the present invention, when a starting current flows, a current flows through the auxiliary winding, the PTC element, and the portion between the first and second main terminals of the triac, thereby to start the motor. The PTC element is self-heated and the resistance value thereof is rapidly increased, thereby to restrain the current flowing through the auxiliary winding. In addition, the pate voltage of the triac is reduced by the trigger circuit to turn the triac off after a predetermined time period has elapsed since the motor was started. As a result, the current flowing through the PTC element is cut off.

Consequently, the power consumption can be significantly lowered, as compared with that of the conventional motor starting circuit using a PTC element.

Furthermore, after the portion between the first and second main terminals of the triac is turned off, no current flows through the PTC element. Accordingly, it is possible to shorten return time required until the motor is restarted, and a time period during which the PTC element is under high temperatures is shortened. Therefore, a thermally adverse effect exerted on components around the PTC element is reduced and the life of the PTC element itself is lengthened.

Additionally, the triac is connected in series with the PTC element. Accordingly, a contactless type current cutoff circuit can be operated under a low current, so that the reliability of the motor starting circuit is increased.

Moreover, even if the triac develops a fault and a short occurs between the first and second main terminals, the current flowing through the auxiliary winding can be restrained by the PTC element, so that the motor starting circuit is superior in safety.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
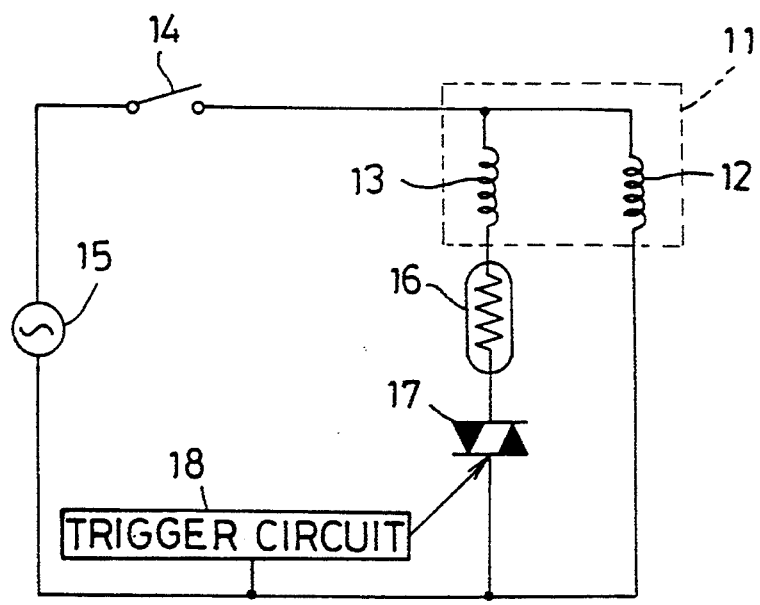
FIG. 1 is a circuit diagram showing a circuit for starting a single-phase AC induction motor according to an embodiment of the present invention.

The present invention will be made clear by describing an embodiment of the present invention while referring to the drawings.

FIG. 1 is a circuit diagram showing a circuit for starting a single-phase AC induction motor according to an embodiment of the present invention. A single-phase AC induction motor 11 has a main winding 12 and an auxiliary winding 13. Respective one ends of the main winding 12 and the auxiliary winding 13 are connected to a power supply 15 through a switch 14. The other end of the main winding 12 is also connected to the power supply 15. A PTC element 16 is connected in series with the other end of the auxiliary winding 13. As the PTC element 16, a PTC element having an arbitrary structure conventionally known is used. One example is a PTC element in which electrodes are formed on both major surfaces of a semiconductor ceramic such as a semiconductor ceramic of a barium titanate system. A first main terminal of a triac 17 is connected to the PTC element 16. A second main terminal of the triac 17 is connected to the power supply 15. Specifically, a portion between the first and second main terminals of the triac 17 is connected in series with the auxiliary winding 13 and the PTC element 16.

On the other hand, a tripper circuit 18 is connected to a gate terminal of the triac 17. The tripper circuit 18 applies a pate voltage to the pate terminal of the triac 17 and is so constructed as to reduce the gate voltage such that the portion between the first and second main terminals of the triac 17 is turned off after a predetermined time period has elapsed since the motor 11 was started. As the trigger circuit 18, a known circuit such as a CR circuit can be used. One example is shown in FIG. 4.

The tripper circuit 18 is so constructed that a diode 23, a resistor 24 and a capacitor 25 are connected in series between terminals 21 and 22 connected to the power supply 15 (see FIG. 1), and a node 26 between the resistor 24 and the capacitor 25 is connected to the pate terminal of the triac 17. In this tripper circuit 18, the gate voltage is reduced utilizing a charging voltage applied to the capacitor 25 after the power supply 15 is turned on.

Figure 4:
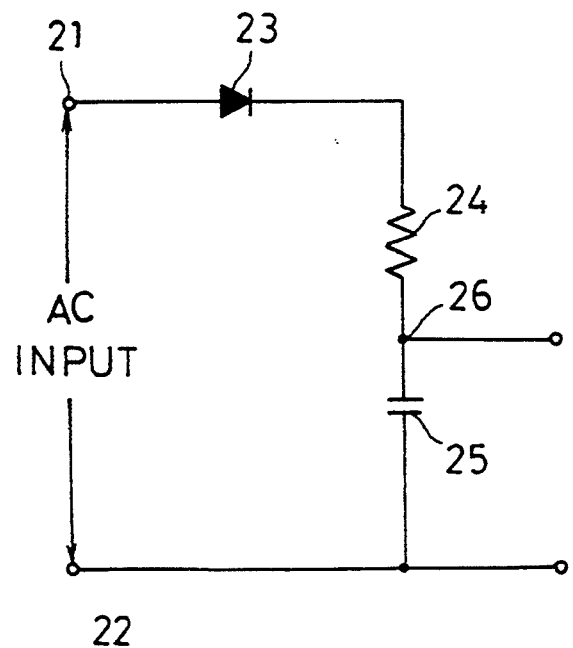
FIG. 4 is a circuit diagram showing one example of a trigger circuit.

Meanwhile, the trigger circuit 18 can be realized by the arrangement of the known circuit such as the CR circuit shown in FIG. 4. However, the timing at which the triac 17 is turned off may be set on the basis of the time period elapsed since the motor 11 was started. Alternatively, it may be set on the basis of the number of revolutions of the motor 11 and the induced electromotive force produced in the auxiliary winding 13.

Description is now made of the operation of the circuit for starting a single-phase AC induction motor according to the present embodiment.

The switch 14 is closed, so that the trigger circuit 18 is operated, the portion between the first and second main terminals of the triac 17 is turned on, a current flows through the auxiliary winding 13, and the single AC induction motor 11 is started. The current flows through the PTC element 16, so that the PTC element 16 is self-heated and the resistance value thereof is rapidly increased. As a result, the value of a current flowing through the auxiliary winging 13, the PTC element 16 and the triac 17 is rapidly decreased.

Furthermore, the trigger circuit 18 reduces a gate voltage of the triac 17 to turn the portion between the first and second main terminals of the triac 17 off after a predetermined time period has elapsed since the single-phase AC induction motor 11 was started. As a result, the current flowing through the auxiliary winding 13 is made zero. The main winding 12 and the trigger circuit 18 are energized until the switch 14 is opened. Accordingly, the portion between the first and second main terminals of the triac 17 is kept off until the switch 14 is opened.

Figure 2:
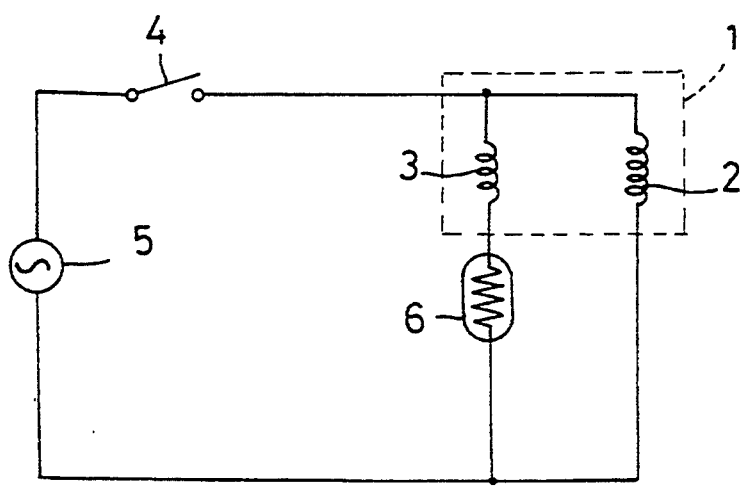
FIG. 2 is a circuit diagram showing a conventional motor starting circuit.
Figure 3:
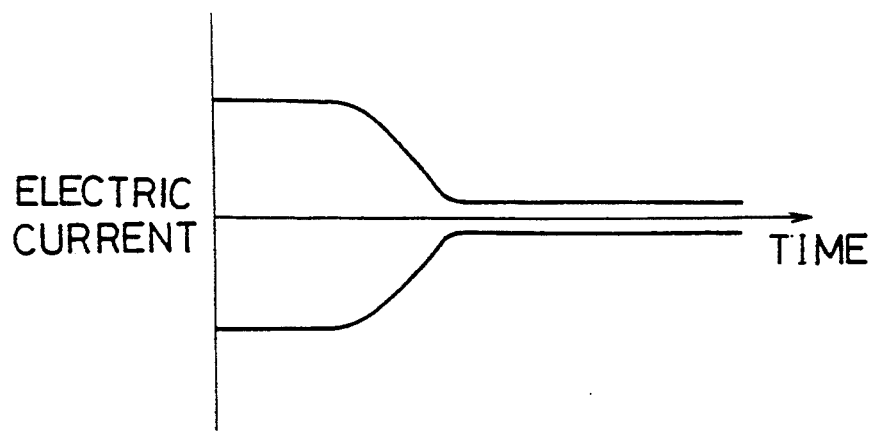
FIG. 3 is a diagram showing the change with time of a current flowing through a PTC element in the conventional example.

In the motor starting circuit according to the present embodiment, therefore, after the motor 11 is started and the triac 17 is turned off, only power in the main winding 12 and power in the trigger circuit 18 are consumed. Accordingly, the power consumption can be decreased by almost one tenth, as compared with that of the conventional motor starting circuit shown in FIG. 2.

Moreover, after the portion between the first and second main terminals of the triac 17 is turned off, the PTC element 16 is not energized. Accordingly, the temperature of the PTC element 16 is gradually lowered during the rated operation of the motor 11. Consequently, the PTC element 16 is sufficiently cooled by the time the switch 14 is turned off to restart the motor 11. Therefore, it is possible to shorten return time required until the motor is restarted, as compared with that in the conventional motor starting circuit shown in FIG. 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuit for starting a single-phase AC induction motor having a main winding and an auxiliary winding, comprising:

a positive temperature coefficient thermistor element connected in series with the auxiliary winding;

a triac having first and second main terminals and a gate terminal, a portion between said first and second main terminals being connected in series with said positive temperature coefficient thermistor element; and a trigger circuit connected to the gate terminal of said triac and reducing a gate voltage of the triac to turn the triac off after a predetermined time period has elapsed since the single-phase AC induction motor was started.

2. The circuit for starting a single-phase AC induction motor according to claim 1, wherein said trigger circuit has a resistor and a capacitor connected in series, a node between said resistor and said capacitor being connected to the gate terminal of said triac.

3. The circuit for starting a single-phase AC induction motor according to claim 2, wherein the gate voltage is reduced by charging said capacitor, thereby to determine said predetermined time period.

4. The circuit for starting a single-phase AC induction motor according to claim 2, further comprising a diode connected to a portion between said trigger circuit and a power supply.

5. The circuit for starting a single-phase induction motor according to claim 1, wherein said positive temperature coefficient thermistor element is constructed using a semiconductor ceramic of a barium titanate system.

* * * * *